US006352273B1

(12) United States Patent
Dickie

(10) Patent No.: US 6,352,273 B1
(45) Date of Patent: Mar. 5, 2002

(54) SEAT MOUNTING ASSEMBLY

(75) Inventor: Paul C. Dickie, Clovis, CA (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/430,041

(22) Filed: Oct. 29, 1999

(51) Int. Cl.[7] .................................................. B62M 1/14
(52) U.S. Cl. .................. 280/220; 280/226.1; 280/250.1
(58) Field of Search .............................. 280/220, 250.1, 280/226.1, 304.1; 297/338, 344.12, 344.14, 344.15, DIG. 4

(56) References Cited

U.S. PATENT DOCUMENTS 1,434,777 A * 11/1922 Handler ........................ 297/19
3,022,037 A * 2/1962 Stallard ....................... 248/421
4,461,444 A * 7/1984 Grassl et al. ............... 248/550
4,700,921 A * 10/1987 Holbrook .................... 248/421
5,046,571 A * 9/1991 Kullerud .................... 180/65.1
5,613,662 A * 3/1997 Blackmore .................. 248/371
5,853,059 A * 12/1998 Goertzen et al. .......... 180/65.6
6,027,132 A * 2/2000 Robinson et al. ......... 280/250.1
6,139,037 A * 10/2000 Papac ....................... 280/250.1
6,217,057 B1 * 4/2001 Kitchen et al. ............. 280/650

* cited by examiner

*Primary Examiner*—Robert P. Olszewski
*Assistant Examiner*—Michael Cuff
(74) *Attorney, Agent, or Firm*—MacMillan, Sobanski & Todd, LLC

(57) ABSTRACT

A seat mounting assembly permits the elevation of a wheelchair seat frame to be adjusted without varying the longitudinal relationship between the seat frame and the base frame of the wheelchair. The seat mounting assembly includes an adjustable link. The link has a first end and a second end. The first end is adapted to be connected to the wheelchair base frame. The second end is adapted to be connected to the wheelchair seat frame. One of the ends is longitudinally displaceable while the other end is vertically displaceable so that the longitudinal position of the seat frame with respect to the base frame remains constant upon adjusting the link.

7 Claims, 9 Drawing Sheets

SEAT MOUNTING ASSEMBLY

BACKGROUND

This invention relates in general to a seat mounting assembly for use in mounting a seat frame to the base frame of a wheelchair.

Wheelchairs typically include a base frame supported on a supporting surface by idler wheels and drive wheels. The base frame supports a seat frame that is adapted to support a wheelchair occupant. It may be desirable to adjust the elevation of the seat frame, for example, to meet the needs of each wheelchair occupant. Seat mounting assemblies that permit adjustment in the elevation of the seat frame are well known. When adjusting the elevation of the seat frame, it is desirable that the longitudinal position of the seat frame remain constant relative to the base frame.

SUMMARY OF THE INVENTION

This invention is directed towards a seat mounting assembly for a wheelchair which permits the elevation of the seat frame to be adjusted without varying the longitudinal relationship between the seat frame and the base frame. The seat mounting assembly comprises an adjustable link. The link has a first end that is adapted to be connected to the wheelchair base frame and a second end that is adapted to be connected to the wheelchair seat frame. The link is adjustable to raise or lower the position of the seat frame with respect to the base frame. Upon adjusting the link, one of the ends of the link is displaced longitudinally while the other end of the link is displaced vertically so that the longitudinal position of the seat frame with respect to the base frame remains constant.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
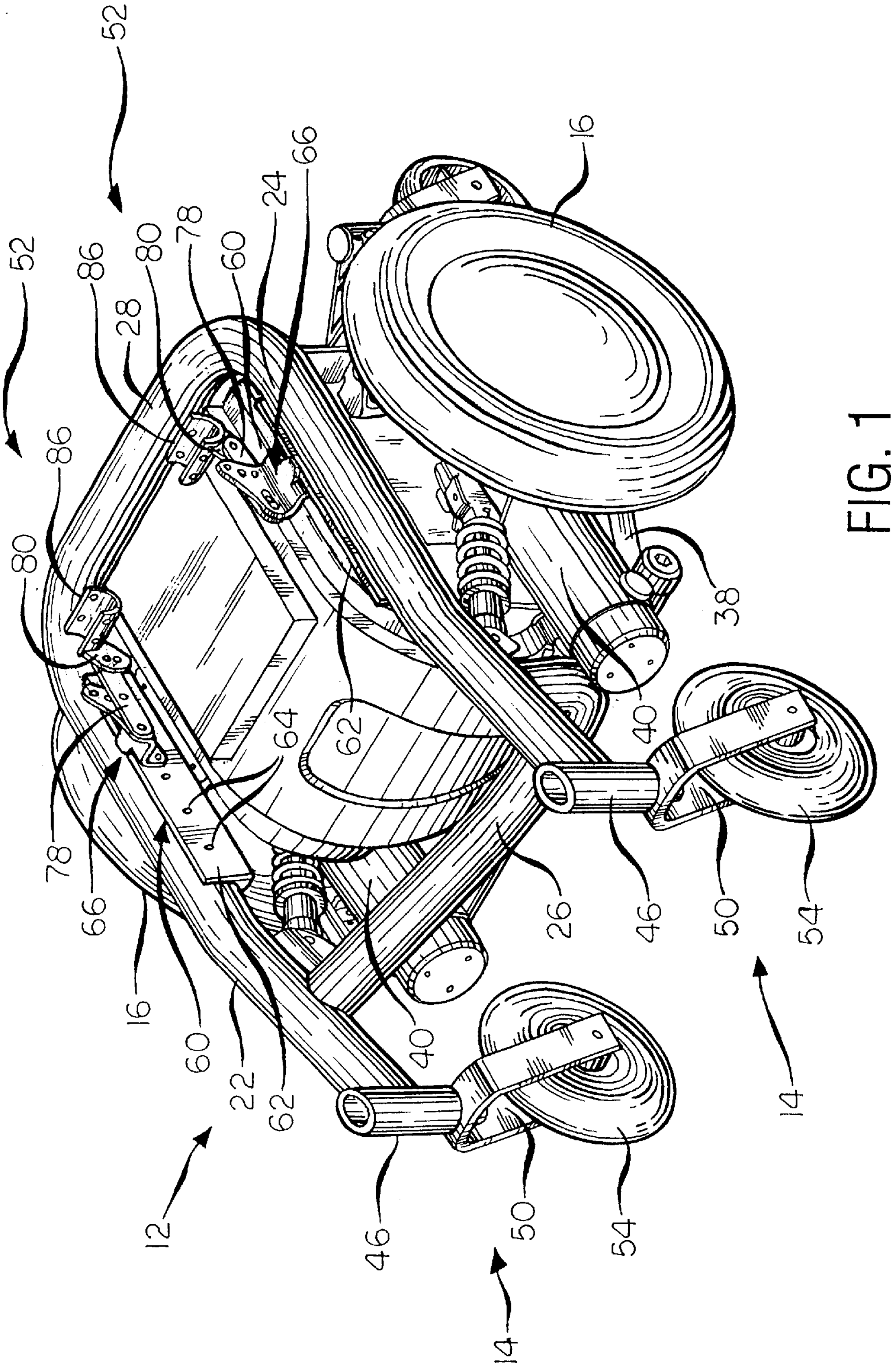
FIG. 1 is a partial perspective view of a seat mounting assembly coupled to a wheelchair base frame.

Referring now to the drawings, there is illustrated in FIG. 1 a wheelchair base frame 12 adapted to be supported on a supporting surface by front casters 14 and drive wheels 16. Anti-tip wheels (not shown) may be attached to a rear portion of the wheelchair.

The base frame 12 is comprised of opposing side frames 22, 24 and front and rear cross members 26, 28. As shown in the drawings, the side frames 22, 24 and the rear cross member 28 may be integrally joined together to form a generally U-shaped member. The front cross member 26 is joined to a front portion of the side frames 22, 24. The front cross member 26 may be in the form of a generally U-shaped member that extends downwardly from the front portion of the side frames 22, 24. The front cross member 26 may support a pivot tube (shown but not referenced) which carries a laterally extending pivot rod (not shown). Opposing ends of the pivot rod, in turn, each may movably support a swing arm 38 (only one shown). Each swing arm 38 is adapted to support a potential motive force, such as the drive motor 40 shown. A transmission (not shown) couples each drive motor 40 to a corresponding drive wheel 16. The drive motors 40 may be differentially operated to maneuver the wheelchair.

A front end of each side frame 22, 24 supports corresponding a front caster 14. As shown in the drawings, caster tubes 46 may be attached to the front ends of the side frames 22, 24. Each caster tube 46 may be adapted to receive a caster stem (not shown) which is coupled to a caster fork 50. Each caster fork 50, in turn, movably supports a front wheel 54. It should be clearly understood that the caster stems are adapted to swivel relative to the caster tubes 46 to permit the front end of the wheelchair to be maneuvered as the drive wheels 16 are differentially operated.

Each side frame 22, 24 may further support a seat mounting assembly 52. In particular, each side frame 22, 24 may support a first part of a first coupling 60 of the seat mounting assembly 52. This first part may be in the form of a longitudinally and vertically extending elongate plate 62 which is adapted to be rigidly connected or attached to an inner surface of the side frames 22, 24, thus forming a first rigid connection. The plate 62 may be provided with a series of longitudinally spaced holes 64. The holes 64 are adapted to receive fasteners (not shown). For example, the holes 64 may be provided with an internal thread and the fasteners may be in the form of threaded fasteners that are threadably engageable with the internal thread. The plate 62 is adapted to support a second part of the first coupling 60. The second part of the first coupling 60 may be in the form of a bracket, such as the generally Z-shaped bracket 66.

Figure 2:
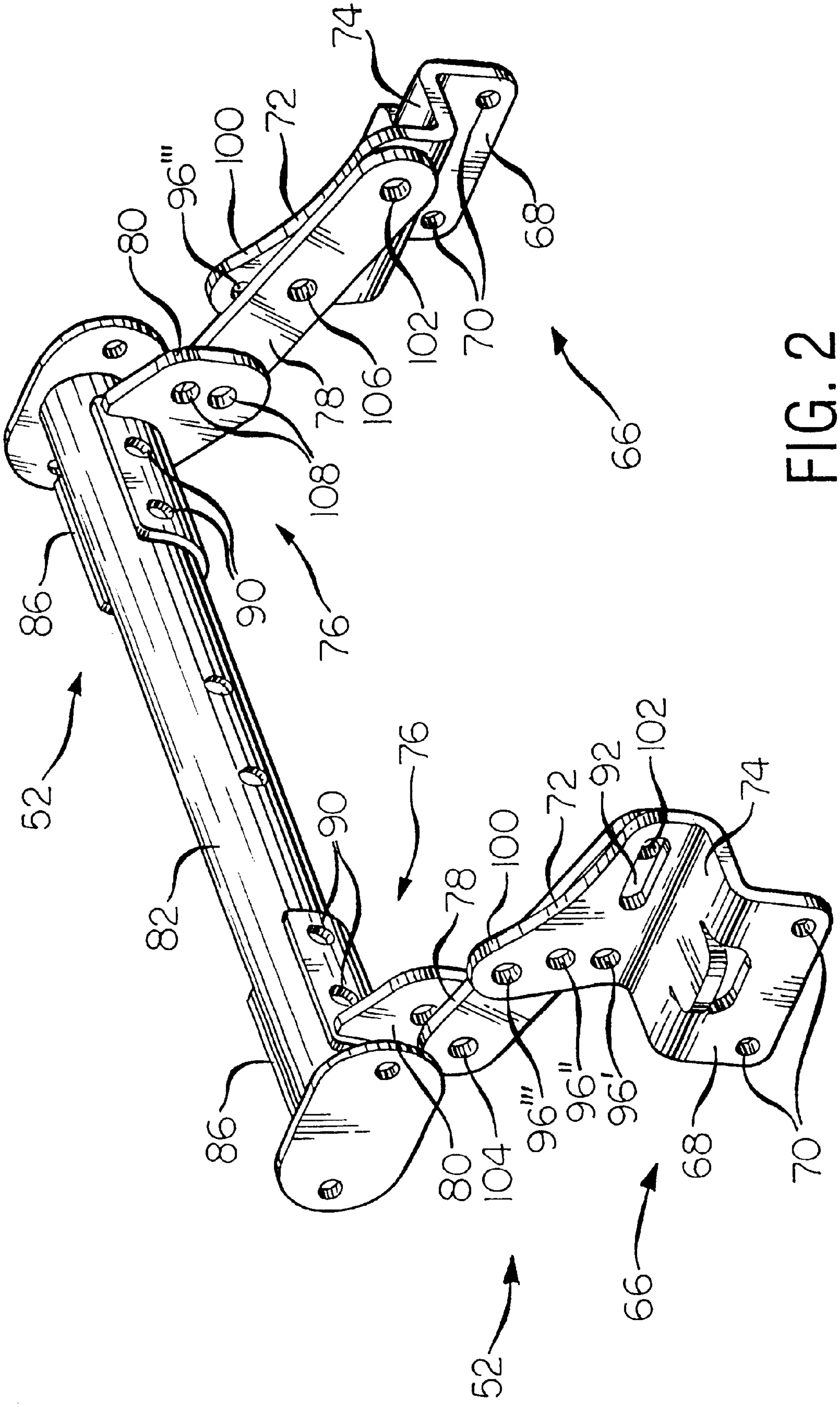
FIG. 2 is an enlarged perspective view of the seat mounting assembly shown in FIG. 1 coupled to a seat frame cross tube.

As shown in FIG. 2, the Z-shaped bracket 66 may include a substantially planar, elongate lower leg 68 that may be longitudinally and vertically oriented so as to be situated juxtaposed the plate 62 (shown in FIG. 1). The lower leg 68 may be provided with longitudinally spaced holes 70 that are adapted to align with the holes 64 in the plate 62. Fasteners (not shown) may be inserted into and through the holes 70 in the lower leg 68 and thereafter threaded into the holes 64 in the plate 62 to secure the Z-shaped bracket 66 to the plate 62. It should be appreciated that the holes 70 in the lower leg 68 may be arranged to align with various holes of the series of holes 64 in the plate 62 to permit the Z-shaped bracket 66 to be secured to the plate 62 at different longitudinal locations along the plate 62. In this way, the Z-shaped bracket 66 may be longitudinally adjustable relative to the plate 62.

Figure 3:
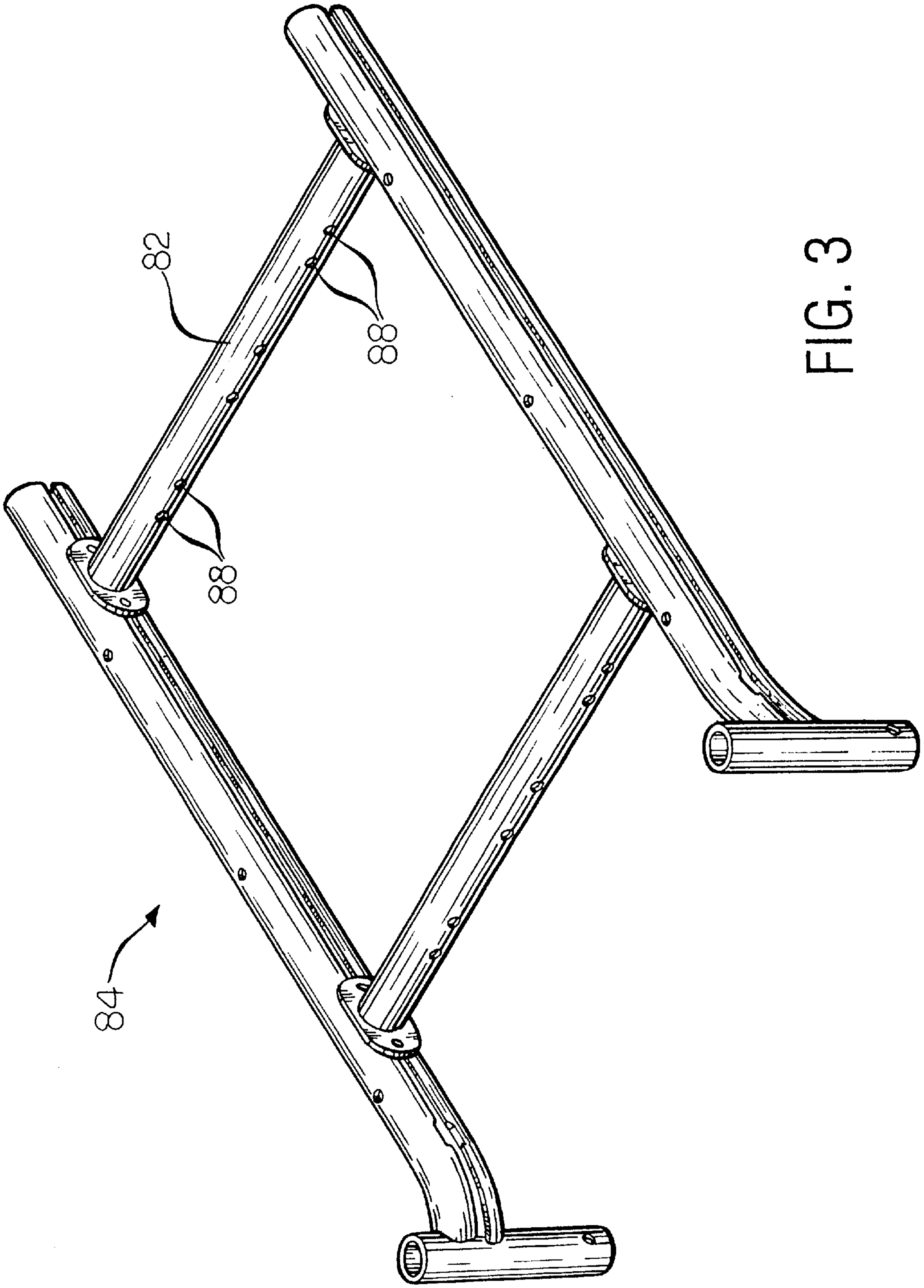
FIG. 3 is a perspective view of a pair of seat frame cross tubes connected between opposing seat frame side tubes to form a seat frame.

The lower leg 68 of the Z-shaped bracket 66 is connected to an upper leg 72 by a substantially planar, horizontally disposed bridge element 74. The upper leg 72 may be connected to a second coupling 76 via an adjustable link 78 that extends between the upper leg 72 and a first part of the second coupling 76. The link 78 may be in the form an elongate planar element that extends longitudinally from the upper leg 72. A first end of the link 78 is adapted to be attached or connected to the upper leg 72 of the Z-shaped bracket 66 while an opposing or second end of the link 78 is adapted to be attached to the first part of the second coupling 76. The first part of the second coupling 76 may be in the form of a tab or projection 80. The projection 80 is adapted to extend perpendicularly relative to a cross tube 82 of a seat frame, such as the seat frame 84 shown in FIG. 3.

The cross tube 82 may be tubular or cylindrical in shape and the projection 80 may extended radially from a second part of the second coupling 76. The second part of the second coupling 76 may be in the form of a substantially U-shaped bracket 86 that is adapted to snugly receive the cross tube 82. The substantially U-shaped bracket 86 may be in the form of an elongate tubular member having a longitudinal opening through which the cross tube 82 may be received. The cross tube 82 has a plurality of longitudinally spaced, laterally extending holes 88 (shown in FIG. 3), which are adapted to align with similarly arranged holes 90 in the substantially U-shaped bracket 86. A fastener, such as a threaded fastener (not shown), may be inserted into and through the holes 88, 90 and threadably engaged with a nut to connect or attach the substantially U-shaped bracket 86 rigidly to the cross tube 82, thus forming a second rigid connection.

The Z-shaped bracket 66 may be provided with a substantially linear, elongate slot 92 that extends longitudinally forwardly and rearwardly of the wheelchair. It is preferable that the elongate slot 92 be substantially horizontally disposed and located in a front upper portion of the Z-shaped bracket 66. A series of adjustment holes 96', 96", 96'" are provided in the rear upper portion of the Z-shaped bracket 66. As shown in the drawings, the series of adjustment holes 96', 96", 96'" may be arranged along an arcuate path or line with the lowest adjustment hole 96' colinear, or in linear alignment, with the elongate slot 92. It should be appreciated that the rear upper third portion of the Z-shaped bracket 66 may be provided with an upwardly and rearward extending tongue 100 and that the adjustment holes 96', 96", 96'" may be positioned up into the tongue 100.

Figure 4A:
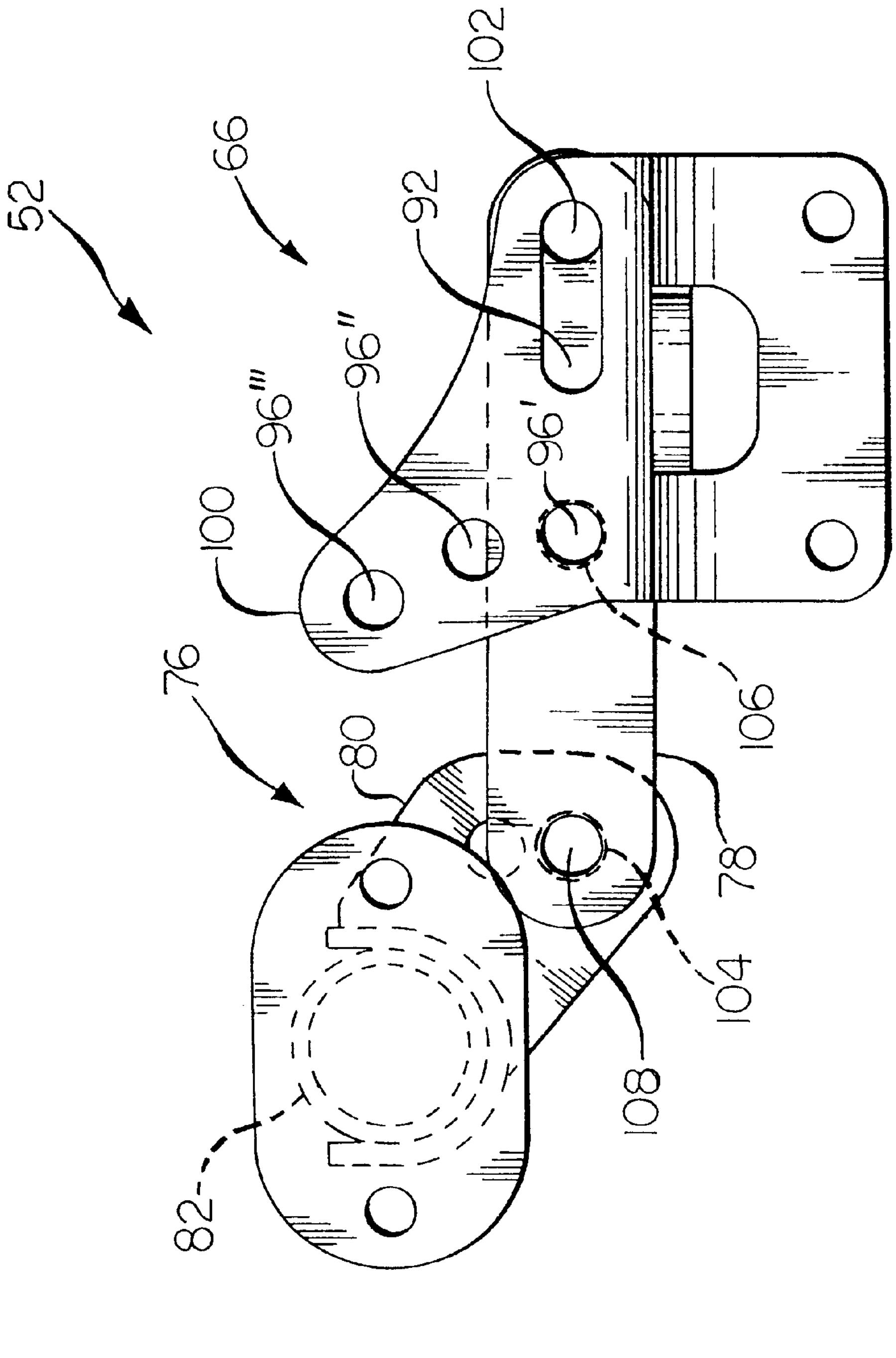
FIGS. 4A–C are side elevational views of the seat mounting assembly adjusted to lowered, intermediate, and raised positions.
Figure 4B:
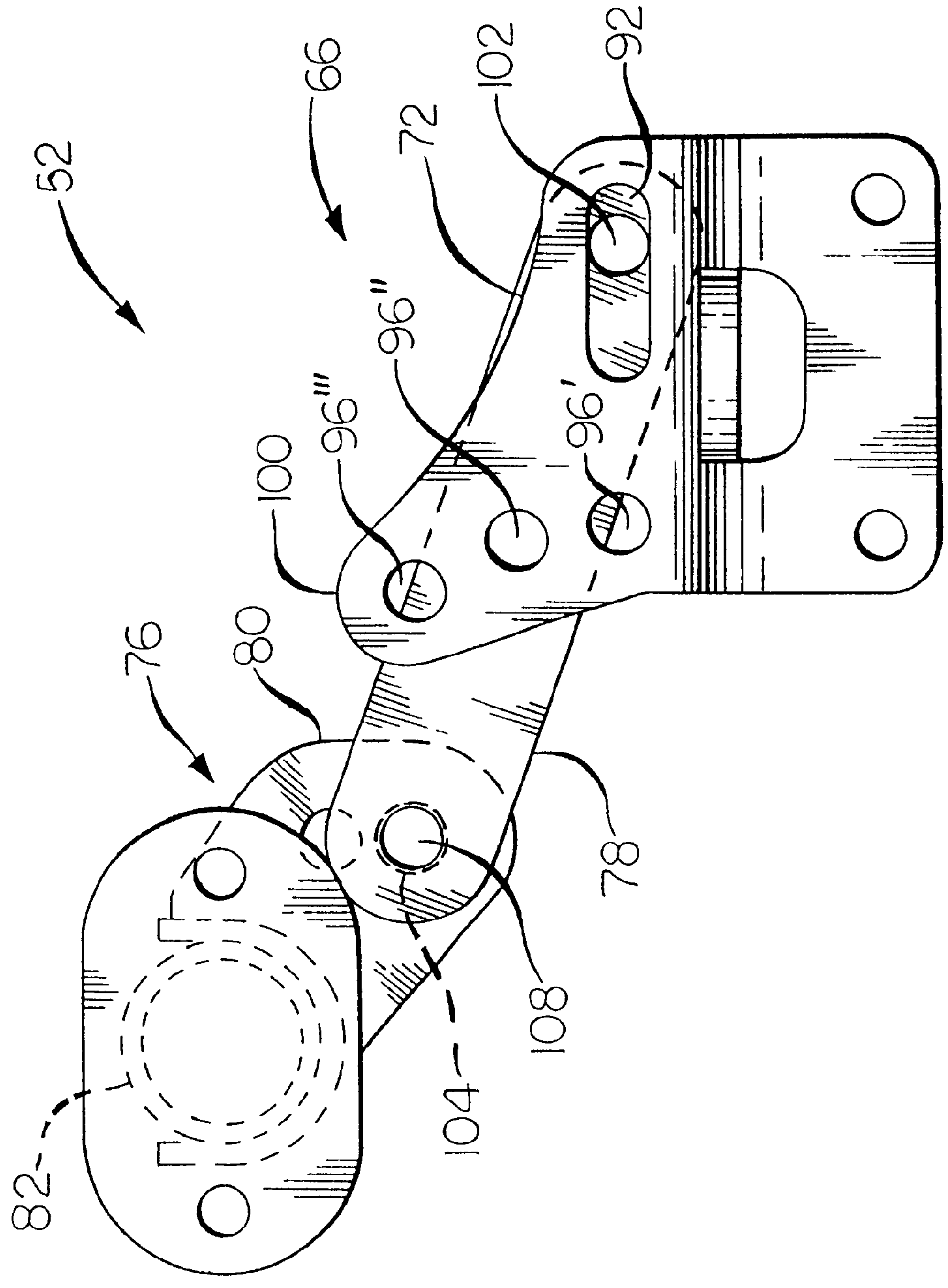
Figure 4C:
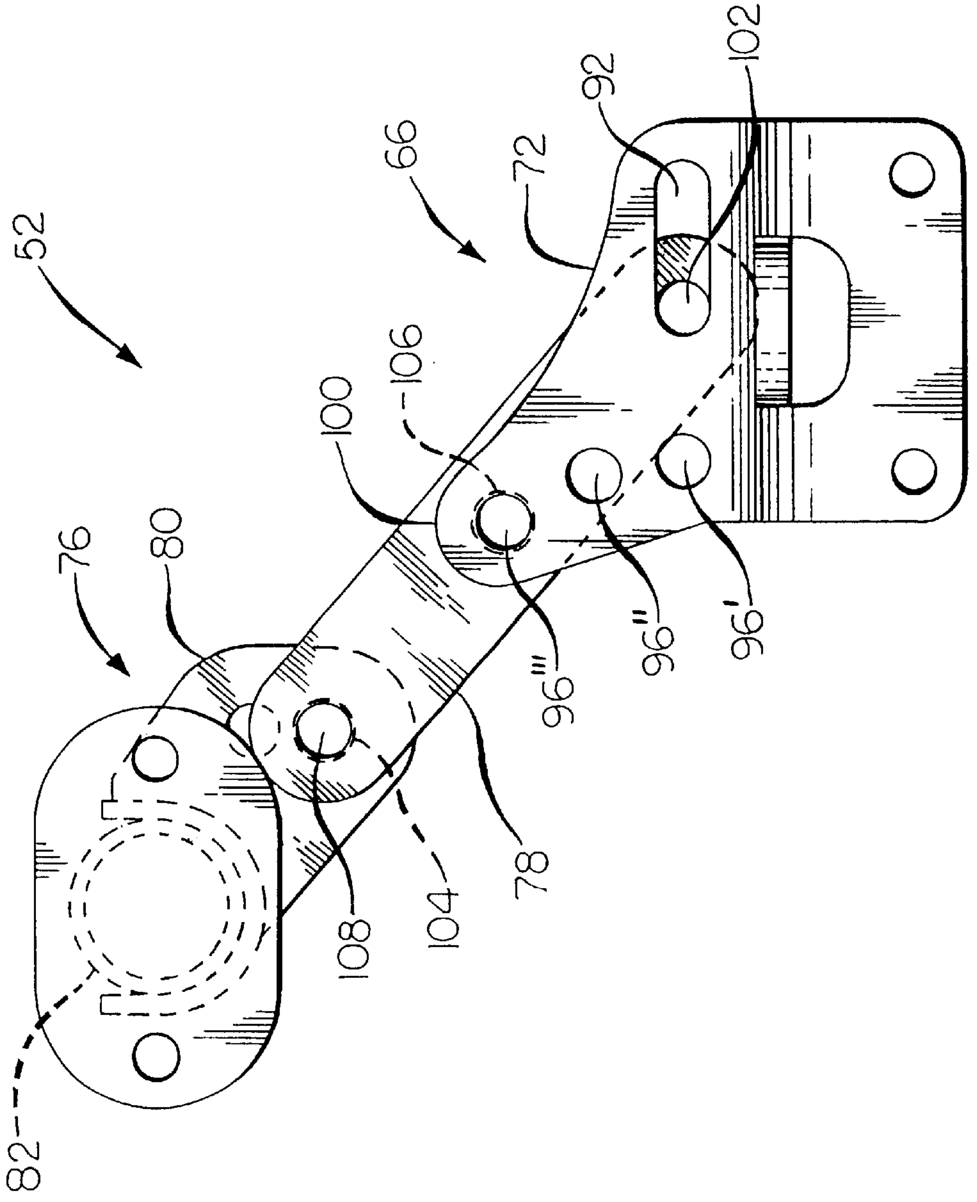

As shown in FIG. 4A, the link 78 may be provided with pivot holes 102, 104 in opposing first and second portions or ends of the link 78 and an adjustment hole 106 in a portion of the link intermediate the pivot holes 102, 104. (Pivot hole 104 and adjustment hole 106 are more clearly illustrated in FIG. 2.) One pivot hole 102 is adapted to align with the elongate slot 92 in the Z-shaped bracket 66. The other pivot hole 104 is adapted to align with a hole 108 in the projection 80 of the second coupling 76. Fasteners, such as pivot pins (not shown), are adapted to be inserted into and through the pivot holes 102, 104 and the corresponding elongate slot 92 and hole 108 in the projection 80 to pivotally connect the link 78 with the Z-shaped bracket 66 and with the projection 80 (shown in FIGS. 1 and 3). That is to say, the link 78 is pivotally connected relative to the frames 12, 84. The adjustment hole 106 in the link 78 is adapted to be aligned with any one of the adjustment holes 96', 96", 96'" in the Z-shaped bracket 66. A fastener, such as a lock pin (not shown), may be releasably inserted into and through the aligning adjustment holes 96', 96", 96'", 106 to secure the third portion of the link 78 in a substantially fixed position relative to the Z-shaped bracket 66 or the base frame 12. For example, the adjustment hole 106 in the link 78 is adapted to align with the lowest adjustment hole 96' in the Z-shaped bracket 66 to position the cross tube 82 at the lowest elevation, as shown in FIG. 4A. Similarly, the adjustment hole 106 in the link 78 is adapted to be vertically displaceable to align with an intermediate adjustment hole 96" in the Z-shaped bracket 66 to position the cross tube 82 of the seat frame 84 at an intermediate elevation, as shown in FIG. 4B. The adjustment hole 106 in the link 78 is further adapted to align with the highest adjustment hole 96'" in the Z-shaped bracket 66 to position the cross tube 82 at the highest elevation, as shown in FIG. 4C. The pivot pin inserted into and through the pivot hole 102 in the link 78 and the elongate slot 92 in the Z-shaped bracket 66 is adapted to be longitudinally and pivotally displaceable in the elongate slot 92 or relative to the base frame 12 as the position of the adjustment hole 106 is varied relative to the adjustment holes 96', 96", 96'" in the link 78 so that the longitudinal position of the seat frame 84 with respect to the base frame 12 remains substantially constant upon adjusting the link 78 to raise or lower the position of the seat frame 84 with respect to the base frame 12.

It should be appreciated that a variation in the elevation of the cross tube 82 results in a corresponding variation in the elevation of the seat frame 84 relative to the front casters 14 of the wheelchair. The change in elevation is achieved by securing the first coupling 60 in a fixed position relative to the base frame 12, securing the second coupling 76 in a fixed position relative to the seat frame 84, and providing an link 78 between the first coupling 60 and the second coupling 76.

The variation in elevation may be incrementally controlled. For example, the adjustment holes 96', 96", 96'" may be uniformly spaced apart. In this way, the relationship between the adjustment holes 96', 96", 96'" in the Z-shaped bracket 66 and the connection between the pivot holes 102, 104 of the link 78 and the elongate slot 92 and the projection 80, respectively, may permit an adjustment between any two adjacent adjustment holes 96', 96", 96'" to result in a uniform or discrete increase or decrease in elevation or position of the cross tube 82. This would permit a wheelchair operator or an attendant to easily determine the change in elevation relative to a number of incremental adjustments.

The substantially planar construction of the upper leg 72, the link 78, and the projection 80 permits the upper leg 72, the link 78, and the projection 80 to pivot relative to one another with minimum friction or interference. However, it should also be appreciated that the invention may be practiced with couplings other than the first coupling 60 and second coupling 76 shown and described in the foregoing description. It should also be understood that the link 78 may be configured in a manner other than that shown and described in the foregoing description. For example, a yoke (not shown) may be substituted in the place of the projection 80 for receiving the link 78. The upper leg 72 need not be linearly shaped. A differently shaped bracket may be substituted in the place of the Z-shaped bracket 66 shown.

Figure 5A:
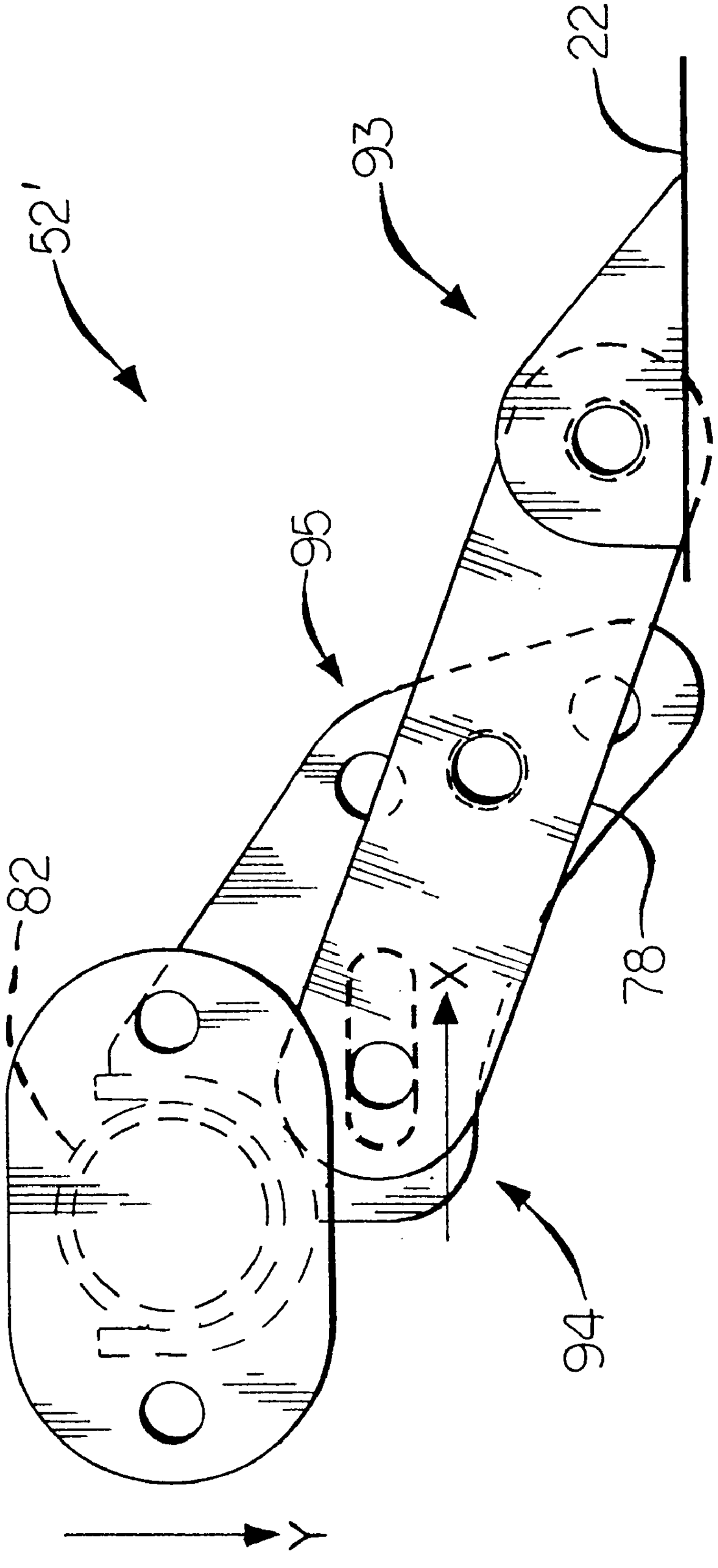
FIGS. 5A–C are diagrammatic representations of alternative seat mounting assemblies.
Figure 5B:
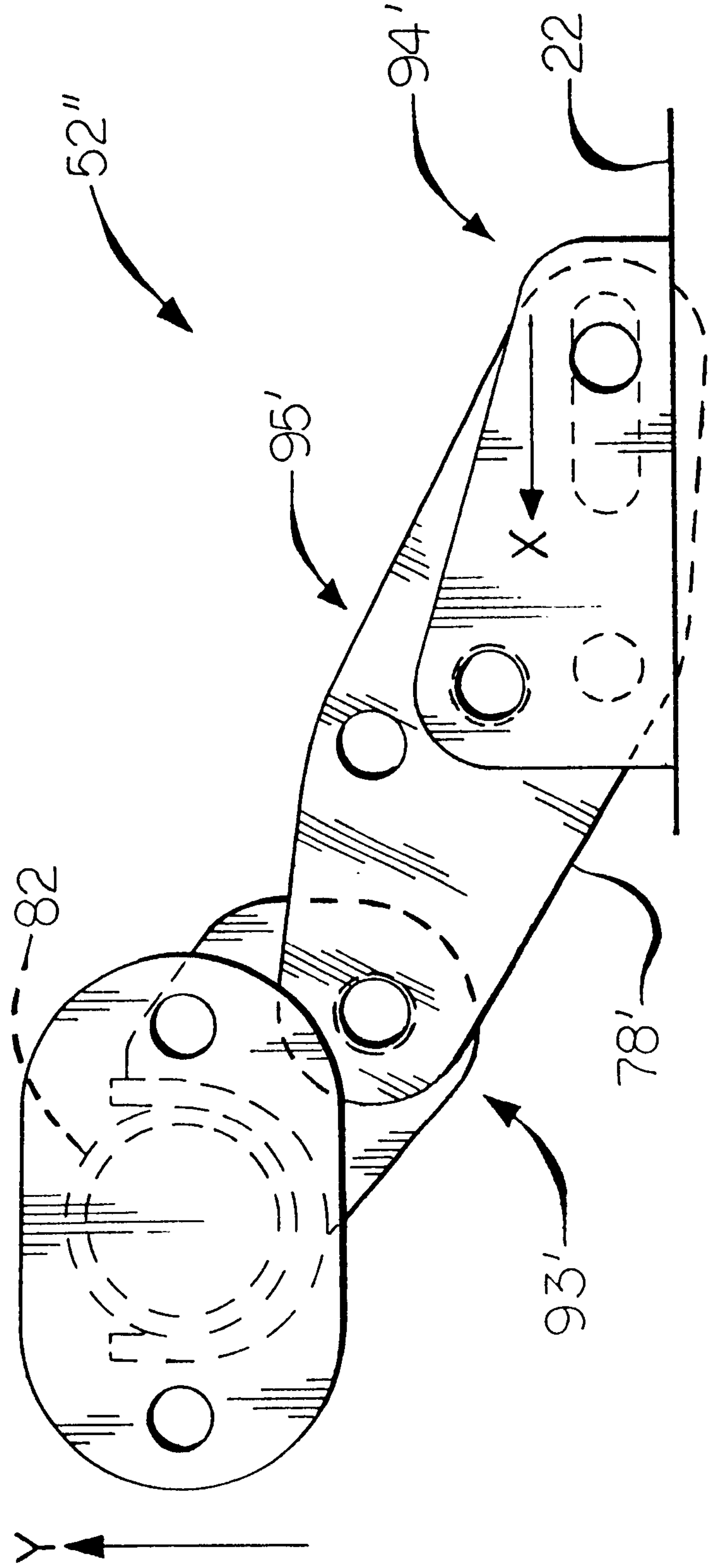
Figure 5C:
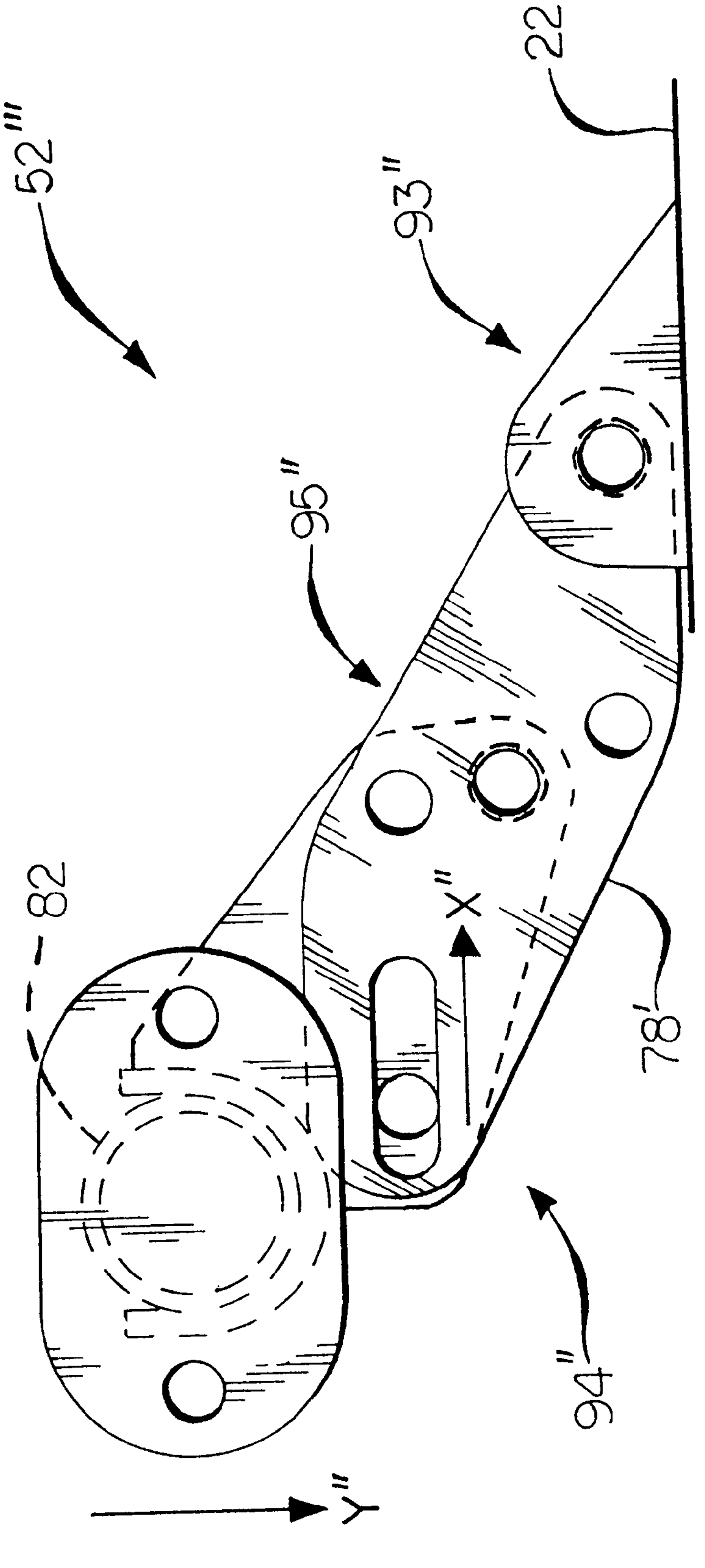

Alternate embodiments of the seat mounting assembly 52', 52", 52'" are diagrammatically represented in FIGS. 5A–C. As shown in each of these drawings, the seat mounting assembly link 78, 78' may include a first portion 94, 94', 94" that may be longitudinally or linearly displaceable and pivotally displaceable relative to a portion (such as the side frames 22, 24 of the base frame 12 or the cross tube 82 of the seat frame 84) of the base or seat frame 12, 84 (shown in FIGS. 1 and 3). A second portion 93, 93', 93" is adapted to pivot relative to another portion (that is to say, the other of the cross tube 82 or the side frames 22, 24) of the base or seat frame 12, 84. A third portion 95, 95', 95" is adjustable relative to one of the portions (either the side frames 22, 24 or the cross tube 82) of the base or seat frame 12, 84. The first portion 94, 94', 94" may be connected to one of the frame portions by a first or linearly or longitudinally displaceable pivotal connection. The second portion 93, 93', 93" may be connected to another frame portions by a second or substantially fixed pivotal connection. The third portion 95, 95', 95" is connected to the frame portion 22, 82 in which the first portion 94, 94', 94" is connected with a third or adjustable portion or connection, which is adjustable to a plurality of discrete positions. The first connection is displaceable in a first direction or in the direction of arrow X, X', X" upon adjusting the adjustable portion or connection in a second direction or in the direction of arrow Y, Y', Y".

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seat mounting assembly for a wheelchair having a base frame for supporting a seat frame, said seat mounting assembly comprising:

a first coupling adapted to be attached to the wheelchair base frame;

a second coupling adapted to be attached to the wheelchair seat frame; and a link connected to said first coupling at a first connection and connected to said second coupling at a second connection, said link having a third connection intermediate said first and second connections, said third being adjustably connected to one of said couplings, whereby the base frame and the seat frame are adapted to remain in constant longitudinal positions relative to one another upon adjusting said third connection.

2. The seat mounting assembly of claim 1 wherein said first and second connections are pivotal connections and said third connection is adjustable to a plurality of discrete positions relative to a corresponding one of said couplings.

3. The seat mounting assembly of claim 1 wherein said first connection is a longitudinally displaceable pivotal connection and said second connection is a fixed pivotal connection and said third connection is adjustable to a plurality of discrete positions relative to a corresponding one of said couplings.

4. The seat mounting assembly of claim 1 wherein said first connection includes a pivot pin that is displaceable in a slot upon adjusting said third connection, and said third connection comprises a series of spaced apart holes and a fastener that is adapted to be inserted in any one of said holes to adjust said third connection to any one of said discrete positions.

5. The seat mounting assembly of claim 4 wherein said slot is elongated and said holes are arranged along an arcuate line.

6. The seat mounting assembly of claim 5 wherein said holes are uniformly spaced apart.

7. A seat mounting assembly for a wheelchair having a base frame for supporting a seat frame, said seat mounting assembly comprising:

a first coupling adapted to be attached to the wheelchair base frame;

a second coupling adapted to be attached to the wheelchair seat frame; and a link pivotally connected to said first coupling at a first pivotal connection and pivotally connected to said second coupling at a second pivotal connection, said link having a portion that is adjustable relative to said first coupling, said first pivotal connection being displaceable in a first direction upon adjusting said adjustable portion in a second direction, wherein said first coupling includes an elongate slot and at least two adjustment holes, said second coupling includes a pivot hole, and said link includes opposing ends each having a pivot hole and an adjustment hole intermediate said opposing links, said elongate slot and said pivot hole in one of said ends of said link aligning to receive a first pivot pin, said pivot hole in the other one of said ends of said link and said pivot hole in said second coupling aligning to receive a second pivot pin, said link being adapted to align with any one of said adjustment holes in said first coupling to receive a fastener for attaching said link to said first coupling.

* * * * *